June 2, 1959 K. F. MÖLLERING ET AL 2,888,920
FACE MASK

Filed March 5, 1957 2 Sheets-Sheet 2

INVENTORS
Karl F. Mollering
Hermann Tietze

BY
Bailey, Stephens & Huettig
ATTORNEYS

United States Patent Office 2,888,920
Patented June 2, 1959

2,888,920

FACE MASK

Karl F. Möllering and Hermann Tietze, Lubeck, Germany, assignors to Otto Heinrich Drager, Lubeck, Germany Application March 5, 1957, Serial No. 644,079

5 Claims. (Cl. 128—141)

This invention is directed to face masks of the respiratory type.

Vapor condensation occurs on the inside of the eye glass lenses of safety masks, such being caused by moisture in the exhaled breath. This fogs the lenses and decreases visibility therethrough. To overcome this, clear glass has been used which is composed of transparent maetrial having a hygroscopic layer of material on the inner eye glass lenses surface. This layer prevents fogging by absorbing the condensed water drops. However, clear glass is relatively expensive, and its activity is limited to the absorption of the hygroscopic layer, which necessitates frequently changing the eye glass lenses.

Moreover, hygroscopic layers are used efficiently only in masks having relatively round or almost flat eye glass lenses. A further difficulty lies in that clear glass windows are optically inefficient.

In order to prevent fogging of the eye glass lenses, it has also been suggested to apply some kind of a liquid or paste on the inside of the eye glass lens which will reduce the surface tension of the condensed water particles so that the water will not form as single drops on the eye glass lens. This also has the disadvantage of a limited activity and needs frequent renewal.

It is further known to prevent fogging of the eye glass lenses by conducting the intake inhalation air directly to the eye glass lens area. This is objectionable in that the air is channeled to the eye glass lens area at a relatively high speed which is discomforting to the eyeball and can also lead to dangerous eye infections. A further disadvantage occurs in the time of no inhalation air flow alternated with the exhaled air periods, during which time moisture will condense on the eye glass lenses, even if only for a short period.

It has also been known to construct masks composed of an outer mask fitted with an inner mask, with the inner mask separated into two sections. The smaller inner mask is hollowed in order to fit over and protect the mouth and nose and is connected to the exterior by means of an exhaust exhalation valve. Air drawn into the mask through the intake valve has access initially only to the intermediate space between the outer and inner masks and flushes this area and by-passes the inside of the eye glass lenses. Only then does it reach the air in the hollow space on the inner side of the inner mask. Exhaled air passes directly from the inner mask to the exterior, and the moisture in the exhaled air is thus kept from being deposited on the eye glass lenses.

In the above form, the inner and outer masks are each, respectively, tightly fitted on the skin of the face of the wearer of the mask. A check valve is fitted between the outer and inner masks which prevents the back flow of the fresh air intake. This form has several disadvantages in that it is quite complicated in production, as the final masks essentially consist of two separately produced masks which must be connected to each other. This results in the formation of a relatively stiff mask. As the shape of each person's face is different, it is difficult to make such a mask fit tightly. Also, another disadvantage is in that only a small part of the intake air passes the eye glass lenses.

The object of this invention is to improve upon the means of directing intake air into a face mask so as to prevent the fogging of the eye glass lenses.

In general, the object is obtained by providing an air channel across the inside of the window lenses. This channel is formed in part by a wall projecting inwardly from the body of the mask and adapted to contact the face. This wall extends between the mouth and the chin and upwardly along side of the nose to adjacent the eye socket openings in the mask. The wall is then extended to the edge of the mask adjacent part of the periphery of the eye openings and is provided with air passages therethrough. This form of the invention has the advantage of making two channels, one of which surrounds the mouth and nose. The intake inhalation air is forced to pass over the window lenses, because the air can enter the nose and mouth chamber only through the openings above the nose. The wall and the mask are of one-piece construction.

In one form of the invention, the portions of the wall extending along the side of the nose are joined to a second rib or wall which extends across the lower portion of the eye socket to the edge of the mask. These eye socket walls are fitted with openings for air passage. By this means the separation of the interior of the mask into two channels is made below the eyes. Therefore, the intake air is forced over the inner surfaces of the eye glass lenses. The openings in these walls can also be formed so that they deflect the air towards the window glass lenses.

In another form of the invention, the wall extending along the nose is joined to other ribs or walls which extend upwardly, pass the bridge of the nose, to the top edge of the mask above the eyes. This rib or wall is also formed with openings for air passage in the vicinity of the eyes. Consequently, the inhaled air is forced to enter the inner channel through these openings. As the openings are immediately adjacent the eye glass lenses, the air is forced over the lenses.

In either of the above cases, the positioning of the rib or wall adjacent the eye sockets effects a good separation of the outer and inner air channels so that the exhaled air will not flow toward the eye glass lenses.

The ribs and walls adapted to contact the face are produced by molding inwardly projecting concavo-convex ribs in the body of the mask. In addition to providing production advantages, this form of mask has a great elasticity, and the mask will fit various shapes of faces. In addition, the fit is tight and comfortable.

The means by which the object of the invention is obtained are described more fully with reference to the accompanying drawings, in which.

The body 1 of the mask has an intake inhalation air connecting tube 2 which contains an intake valve. Eye socket openings in the mask are provided with the eye glass lenses 3.

Figure 1:
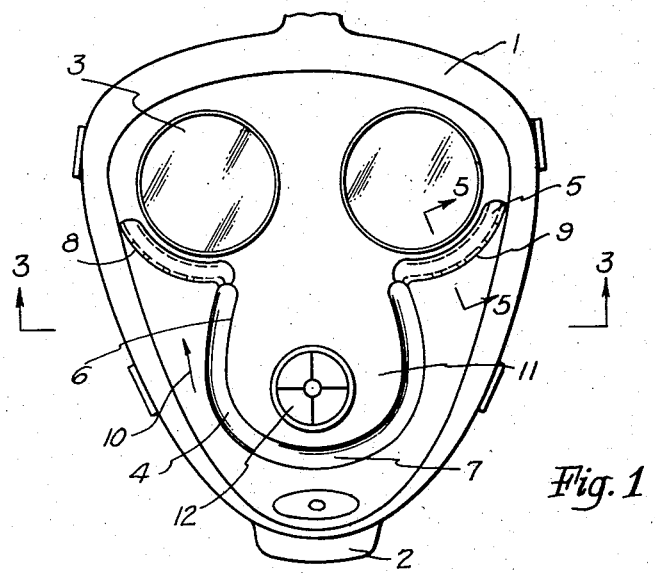
Figure 1 is an elevational view of the inside of a mask.

Projecting inwardly from the body of the mask is a concavo-convex U-shaped rib or wall 4 molded in the body. In the modification of Figure 1, this wall starts from the end 5 at the edge of the mask and extends below the eye opening until it joins the U-shaped portion extending down along the side of the nose and between the mouth and chin. The bight 7 of the U forms the chin support, while the remaining part of the rib contacts the face. In the wall portions 8 extending beneath the eye openings are the air passage openings 9. The intake air comes in through tube 2 and flows in the direction of the arrows 10 through the openings 9 over the inside surface of the lenses 3, and from there into channel 11 which surrounds the mouth and nose. Exhaled air is exhausted through valve 12 mounted in the body of the mask over the nose portion thereof.

Figure 2:
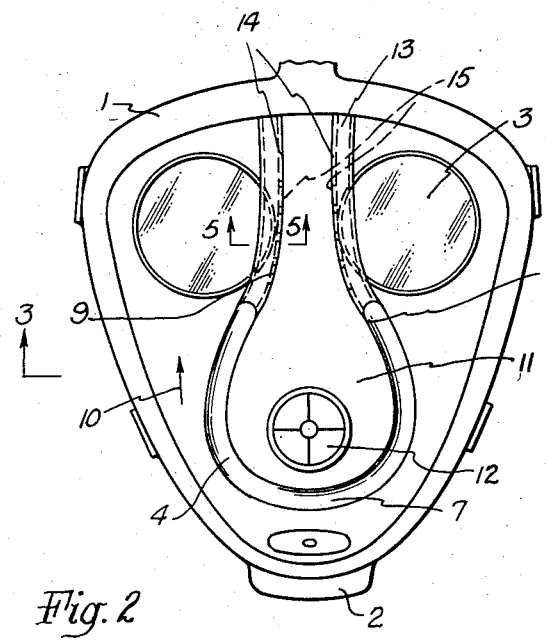
Figure 2 is a similar view of a modified form of mask.

The modified form of mask shown in Figure 2 differs from Figure 1 principally in that wall 4 is extended across the nose bridge portion of the mask and has its upper end 13 terminating at the edge of the mask above the eyes. From point 6 downwardly around the mouth, wall 4 is similar to that of Figure 1. In the portion of the wall 14 between point 6 and upper end 13 are air passage openings 15. The openings 15 can be either holes or slots cut in the wall. Wall portion 14 can also be relieved in order to provide space for eye glass frames if the wearer of the mask uses spectacles. Again, the air comes in through intake tube 2 and then flows in the direction of the arrows 10 past the glasses 3. From the glasses the air then passes into channel 11 through the air passage openings 15 or the relieved portions for spectacle frames. Air is exhausted through valve 12.

In both Figures 1 and 2, the air passage openings 9 and 15, respectively, are located immediately adjacent the windows 3 so that the air is forced to pass over these window glasses.

Figure 5:
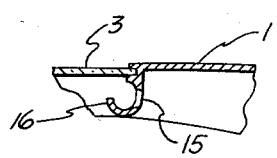
Figure 5 is a cross-sectional view on the line 5—5 of Figure 1 or 2.

As shown in Figure 5, either the wall portion 8 of Figure 1 or 14 of Figure 2 is formed as an inwardly projecting flange with a re-bent free edge 16. This provides a baffle for deflecting air coming through openings 9 and 15 directly onto the window glass.

Figure 3:
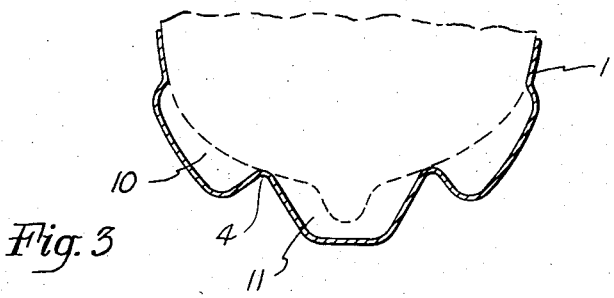
Figure 3 is a cross-sectional view conforming to the lines 3—3 of Figures 1 and 2, respectively.
Figure 4:
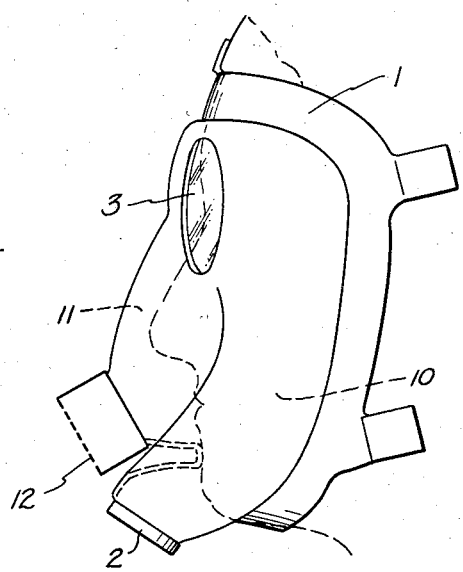
Figure 4 is a side elevational view of either the mask of Figure 1 or Figure 2.

From Figure 3, it is seen that the wall 4 as it extends along the nose and below the mouth is composed of an inwardly projecting concavo-convex rib. This rib construction has the advantage of great elasticity and avoids the need of a specially fitted rib for the separation wall. The mask with wall 4 fits well various shapes of faces.

Having now described the means by which the objects of the invention are obtained, we claim:

1. A respiratory safety face mask comprising a face mask body, eye holes in said body, a U-shaped face contacting rib projecting inwardly from said body and extending beneath the mouth and upwardly along the nose portions of said body to positions adjacent said eye holes, walls extending respectively from said positions along a part of the rims of said eye holes to the edge of said body and dividing the inner surface of said mask into a cheek and a nose and mouth intake air channels, and air openings in said walls for directing intake air across said eye holes.

2. A respiratory safety face mask as in claim 1, said walls extending along the cheek sides of said rims below said eye holes.

3. A respiratory safety face mask as in claim 1, said walls extending upwardly along the nose bridge sides of said rims.

4. A respiratory safety face mask as in claim 3, further comprising relieved portions in said walls for accommodating the eye glass frames worn by a user of the mask.

5. A respiratory face mask as in claim 1, said rib and walls being molded in the body of said mask.

References Cited in the file of this patent

UNITED STATES PATENTS

| 2,156,852 | Horak | May 2, 1939 |

FOREIGN PATENTS

| 297,890 | Great Britain | Sept. 7, 1928 |
| 225,459 | Switzerland | May 1, 1943 |
| 57,146 | Netherlands | Apr. 15, 1946 |